F. A. FELDKAMP.
FUSE INDICATOR.
APPLICATION FILED MAY 16, 1918.

1,314,583.

Patented Sept. 2, 1919.

WITNESSES:
Eva E. Desch

INVENTOR
Frederick A. Feldkamp,
BY
Fraentzel and Richards
ATTORNEYS

UNITED STATES PATENT OFFICE.

FREDERICK A. FELDKAMP, OF NEWARK, NEW JERSEY.

FUSE-INDICATOR.

1,314,583.  Specification of Letters Patent.  Patented Sept. 2, 1919.

Application filed May 18, 1918. Serial No. 234,973.

*To all whom it may concern:*

Be it known that I, FREDERICK A. FELDKAMP, a citizen of the United States, residing at Newark, in the county of Essex and State of New Jersey, have invented certain new and useful Improvements in Fuse-Indicators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to a novel construction of detachable indicator device for electrical cartridge fuses, and the like; and the invention relates, more particularly, to a novel construction, of device which may be readily attached to an electrical cartridge fuse or the like to visually indicate the inoperativeness of the latter after the same has been blown.

The invention has for its principal object to provide a cheap, simple and effective detachable indicator device, for the purposes stated, which is adapted to be electrically and mechanically attached to a cartridge fuse, or the like, and which possesses a novel functioning means adapted to produce a visible sign or indication when the cartridge fuse is blown and becomes inoperative; said sign or indication remaining visible so long as the inoperative fuse remains in place, but becoming invisible when the fuse is repaired, or the indicator device removed and attached to a replacing operative cartridge fuse.

Other objects of the present invention, not at this time more particularly enumerated, will be clearly understood from the following detailed description of the same.

With the various objects of my present invention in view, the same consists, primarily, in the novel indicator device for electrical cartridge fuses, and the like, hereinafter set forth; and, the invention consists, furthermore, in the novel arrangements and combinations of the various devices and parts, as well as in the details of the construction of said devices and parts, all of which will be more fully described in the following specification, and then finally embodied in the appended claims.

The invention is clearly illustrated in the accompanying drawings, in which:—

Similar characters of reference are employed in all of the hereinabove described views, to indicate corresponding parts.

Figure 1:
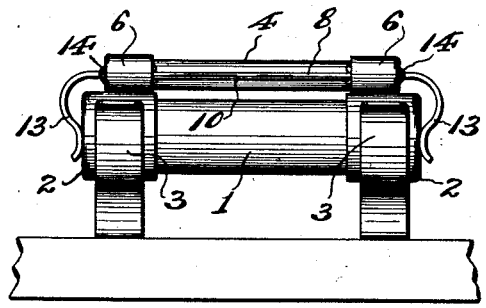
Figure 1 is a side elevation of an electrical cartridge fuse in circuit to which is attached the novel detachable indicator device made according to and embodying the principles of my present invention.
Figure 2:
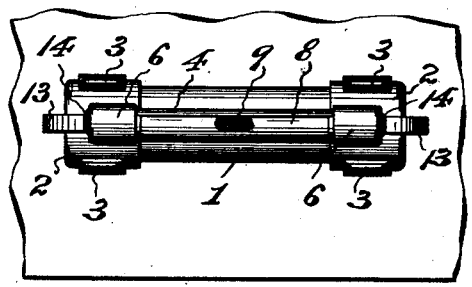
Fig. 2 is a top or plan view of the same.
Figure 3:
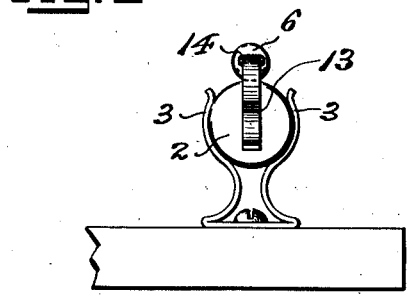
Fig. 3 is an end elevation of the same.
Figure 4:
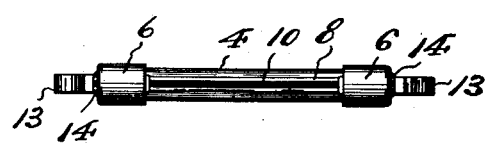
Fig. 4 is a bottom view of said detachable indicator device removed from the fuse cartridge.
Figure 5:
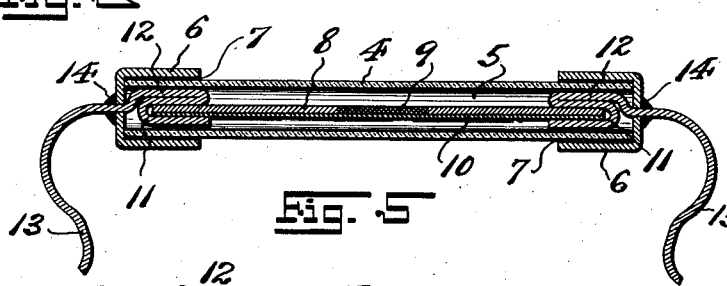
Fig. 5 is a vertical longitudinal section of the novel indicator device, drawn on an enlarged scale.
Figure 6:
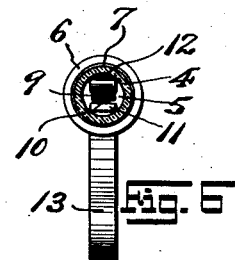
Fig. 6 is a transverse section through the same.

Referring now to the said drawings, the reference character 1 indicates any usual construction of electrical cartridge fuse, having the metal terminal caps 2 engageable by the metallic terminal clips 3 of a suitable fuse box, whereby said cartridge fuse is inserted in a desired electric circuit. In practice, as is well known, an excessive current flowing through the fusible wire of the cartridge fuse tends to so heat the fuse wire that the same melts, thereby breaking the circuit, and thus preventing damage to electrical apparatus connected in said circuit. When the fuse wire is thus disintegrated, the cartridge fuse becomes inoperative, and is then spoken of as "blown". In cases where more than one cartridge fuse is employed in a circuit, or there are several circuits entering through several cartridge fuses at one location, it is frequently difficult to quickly detect which fuses are "blown" and which are still operative. It is, therefore, the object of my present invention to provide a means for indicating at a glance a fuse which is "blown" or inoperative.

The essential features of my novel indicator device comprise an electric heating medium adapted for electrical connection in parallel circuit with the fuse of the cartridge, associated with an absorbent insulating material treated with a chemical substance which changes its color appearance when heated; preferably, I would use a chemical substance which in the presence of moisture remains of neutral aspect, or color, but which, when the moisture is driven away by heat, assumes a markedly contrasting color appearance. This heating material and treated absorbent material are hermetically sealed within a chambered body which retains against permanent escape sufficient moisture for the production of the color changes desired; such chambered body being, in part at least, transparent, so that the color changes brought about may be easily visible; and, furthermore, proper exterior terminals must be provided in connection with said chambered body to permit the making of the required electrical connection of the heating medium in the circuit.

The preferable forms and combinations of the elements making up these essential features are clearly illustrated in the drawings, and the same comprise a transparent tubular body 4 of glass or other suitable material providing an interior chamber 5. Telescoping over each end of said body 4 is an end cap 6, the same serving to close the ends of said chamber 5. The caps 6 are secured in place by a suitable cement 7, which not only serves as a fastening means, but also as a seal against the escape of moisture from the chamber 5.

Arranged within said chamber 5 is a strip 8 of absorbent non-conducting material, such as paper. A portion or all of this strip 8 is treated with a chemical solution functioning to produce color changes as above mentioned. This chemically treated portion of the strip 8 is indicated in the drawings by the reference numeral 9. A chemical solution which serves the purposes desired consists of a solution of cobalt chlorid, either alone or in combination with another salt or another substance having hygroscopic qualities, but the presence of which does not interfere with the color functioning of the cobalt chlorid. For example, the addition of magnesium chlorid, or magnesium and sodium chlorid, to the cobalt chlorid forms a very desirable combination, since the added salt or salts are of a character which readily attract moisture, and consequently aid both in normally maintaining moisture in the presence of and in attracting moisture to the cobalt chlorid when in mixture therewith, yet the same will readily yield up the moisture under the influence of heat. The fibrous nature of the strip 8 is such that the solution of cobalt chlorid is readily taken up thereby and incorporated therewith. The cobalt chlorid possesses the characteristic of being practically colorless or white when in the presence of moisture, and consequently a strip of paper prepared therewith would, when the cobalt chlorid was normally moist, retain its neutral white color, but when, by means of heat or evaporation, the moisture is driven from the cobalt chlorid, would immediately assume a greenish blue color, since the cobalt chlorid impregnating the paper strip turns such greenish blue color when dry, and consequently the paper appears stained therewith.

In order to provide an electric heating medium, I preferably coat the back of said strip 8 with a conducting material 10 of high specific resistance, such as a coating of graphite. By thus coating the back of said strip 8 with graphite, I not only provide a very cheap conducting material or heating element but I also bring such conducting material or heating element into most intimate relation to the chemically treated strip 8.

The reference character 11 indicates metallic U-shaped terminal clamps, one arm of each clamp being doubled back, as at 12, so as to terminate in a spring contact finger 13, which fingers respectively pass through the opposite caps 6, so as to be exteriorly disposed at each end of the body 4; solder 14, or other suitable means, being employed to secure these parts to the caps 6, and also to seal the openings in the caps through which the spring contact fingers emerge.

The treated strip 8 is engaged by its respective ends in the U-shaped clamps 11, so that the graphite conducting material 10 is electrically connected by the contact of said clamps therewith, with the interior spring contact fingers 13, and at the same time the strip 8 is secured in permanent longitudinal extension through the interior of the chamber 5.

In making use of the novel indicator device thus constructed, the spring contact fingers 13 are sprung over the ends of the terminal caps 2 of the cartridge fuse 1, which is connected in an electric circuit. By this arrangement not only is the device mechanically attached to the cartridge fuse, but the conducting material or heating element 10 of the same is connected in the circuit in parallel with the fuse wire of the cartridge fuse. Since, however, said conducting material or heating element 10 is of high resistance, little or no current will pass therethrough while the cartridge fuse is operative, since the current will follow the path of least resistance, viz., through the fuse wire. Consequently the temperature of the conducting material or heating element 10 will remain normal, thereby permitting the cobalt chlorid to absorb and retain sufficient moisture to maintain its neutral appearance. Should the cartridge fuse become "blown", the circuit through the fuse wire thereof is broken, consequently the current will pass through the one terminal cap 2 to the engaging contact finger 13, thence through the conducting material or heating element 10 to the opposite contact finger 13, and back into the line through the opposite terminal cap 2 of the cartridge fuse. The specific resistance of the conducting material or heating element being comparatively high, the same rapidly heats up as the current flows therethrough. The rise in temperature thus effected is rapidly transmitted to the intimately related strip 8 and its cobalt chlorid treated portion 9, so that the moisture present is rapidly driven away from the strip and the cobalt chlorid, thereby effecting the change in color appearance of the strip 8, to wit, producing the greenish blue stain above mentioned. The presence or appearance of this change of color in the strip 8 will at once visibly indicate that the cartridge fuse to which the device is attached, is "blown". Since the heat is maintained so long as the "blown" cartridge fuse remains in the circuit, the color change will also be maintained. If the cartridge fuse is repaired or replaced, and the indicator device attached, the strip 8 will quickly resume normal neutral appearance, since the moisture driven away by the rise in temperature will be reattracted, upon a fall of temperature to normal, by the hygroscopic action of the cobalt chlorid or combined cobalt chlorid and other hygroscopic substance. The purpose of the hermetically sealed chamber 5 will now be apparent, to wit, that it serves to prevent permanent escape of the moisture from the vicinity of the strip 8 and its chemically treated portion 9, for when the moisture is driven away from the strip and its chemical, it is still confined within the chamber 5, and in fact may be precipitated upon the walls thereof but when the normal temperature is regained within the chamber, the hygroscopic attraction effected by the chemical will quickly cause the moisture to combine again with the chemical, and will consequently by its presence produce again the neutral color appearance. It will thus be clearly understood that my device is practically indestructible, and may be used again and again, its cycle of operations, as above described, being readily repeated under the influence of the instigating causes.

It will be also understood that I do not limit myself to the specific chemical elements above mentioned, since I deem my invention of a scope broad enough to include any chemical combination which will produce the results desired.

Figure 7:
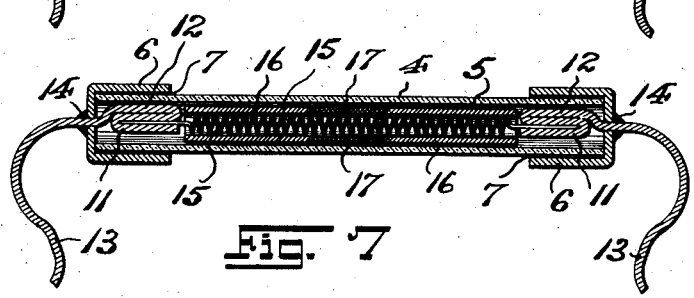
Fig. 7 is a vertical longitudinal section of a slightly modified construction of my novel indicator device, drawn on an enlarged scale.
Figure 8:
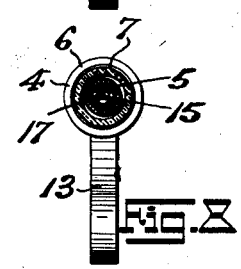
Fig. 8 is a transverse section through the same.

Referring now to Figs. 7 and 8 of the drawings, I have illustrated therein a slightly modified construction of my device. The modification resides more particularly in the character of the heating element and absorbent non-conducting chemically treated strip, since in place of the strip 8 coated with graphite to provide the electric heating element 10, I provide a spiral coil of high resistance wire 15 which is connected between the U-shaped clamps 11 so as to extend through the interior of the chamber 5, and in place of the strip 8, I provide a tubular sleeve of non-conducting absorbent material 16, having the chemically treated portion 17. The tubular sleeve 16 is engaged over and incloses the wire coil 15, so that the heat generated by the latter is quickly transmitted to the former. It will be apparent that these modifications affect the form and not the substance of the changed elements, since both the mode and principles of operation remain the same as far as the functioning of the indicator device thus modified is concerned.

Figure 9:
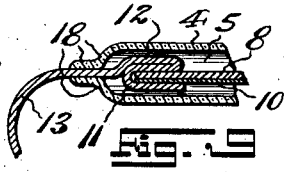
Fig. 9 is a detail vertical longitudinal section of a further modification of my novel indicator device.

Referring now to Fig. 9 of the drawings, I there illustrate another mechanical modification of the construction of my novel indicator device. This modification resides in the elimination of the end caps 6, instead of which I employ a tubular glass body 4, provided with closed ends 18 fused and sealed about the exteriorly projecting contact fingers 13. In other respects the device may be constructed in the ways above described.

I am aware that some changes, other than those already indicated, may be made in the various arrangements and combinations of the several devices and parts, as well as in the details of the construction thereof, without departing from the scope of my present invention as above described, and as defined in the appended claims. Hence, I do not limit my invention to the exact arrangements and combinations of the said devices and parts as described in the foregoing specification, nor do I confine myself to the exact details of the construction of said parts as illustrated in the accompanying drawings.

I claim:—

1. In a device of the kind described, a non-conducting absorbent medium chemically treated with a moisture receptive substance adapted to change color when the moisture is driven off by heat, an electrical heating element associated with said medium, a transparent inclosing means for said medium and heating element sealed against the permanent escape of moisture, and contact devices connected with said heating element projecting exteriorly from said inclosing means.

2. In an indicator device, a non-conducting absorbent medium chemically treated with a moisture receptive substance adapted to change color when moisture is driven off by heat, an electrical heating element of high specific resistance associated with said medium, a hermetically sealed transparent casing inclosing said medium and said heating element, a clamp means within each end of said casing for gripping and supporting the ends of said medium and said heating element, and spring contact fingers connected with said clamp means to project exteriorly from the ends of said casing for engagement with the terminal caps of a cartridge fuse to electrically and mechanically connect the indicator device with said cartridge fuse.

3. In a device of the kind described, a paper medium treated with a hygroscopic solution having a cobalt chlorid base, an electrical heating element intimately related to said paper medium, and means for detachably connecting said heating element in parallel circuit with the fuse wire of a cartridge fuse or the like.

4. In a device of the kind described, a paper medium treated with a hygroscopic solution having a cobalt chlorid base, an electrical heating element of high specific resistance intimately related to said paper medium, a transparent hermetically sealed casing inclosing said paper medium and heating element, and contact devices connected with said heating element and projecting exteriorly from said casing.

5. In an indicator device, a paper medium treated with a hygroscopic solution having a cobalt chlorid base, an electrical heating element of high specific resistance intimately related to said paper medium, a hermetically sealed transparent casing inclosing said paper medium and heating element, a clamp means within each end of said casing for gripping and supporting the ends of said paper medium and said heating element, spring contact fingers connected with said clamp means to project exteriorly from the ends of said casing for engagement with the terminal caps of a cartridge fuse to electrically and mechanically connect the indicator device with said cartridge fuse.

6. In a device of the kind described, a non-conducting absorbent medium chemically treated to change color under the influence of heat, a coating of graphite on the back of said medium to provide an electrical heating element of high specific resistance, and means for connecting said graphite coating in parallel circuit with the fuse wire of a cartridge fuse.

7. In a device of the kind described, a non-conducting absorbent medium chemically treated with a moisture receptive substance adapted to change color when moisture is driven off by heat, a coating of graphite on the back of said medium to provide an electrical heating element of high specific resistance, a hermetically sealed transparent casing inclosing said medium and its heating element, and contact devices connected with said heating element and projecting exteriorly from said casing.

8. In a device of the kind described, a non-conducting absorbent medium chemically treated with a moisture receptive substance adapted to change color when moisture is driven off by heat, a coating of graphite on the back of said medium to provide an electrical heating element of high specific resistance, a hermetically sealed transparent casing inclosing said medium and its heating element, a clamp means within each end of said casing for gripping and supporting said medium in contact with said graphite coating thereof, and spring contact fingers connected with said clamp means to project exteriorly from the ends of said casing for engagement with the terminal caps of a cartridge fuse to electrically and mechanically connect the device with said cartridge fuse.

9. In a device of the kind described, a paper medium treated with a hygroscopic solution having a cobalt chlorid base, a coating of graphite on the back of said paper medium, and means for detachably connecting said graphite coating in parallel circuit with the fuse wire of a cartridge fuse.

10. In a detachable indicator device, a paper medium treated with a hygroscopic solution having a cobalt chlorid base, a coating of graphite on the back of said paper medium, a transparent hermetically sealed casing inclosing said paper medium, and contact devices electrically connected with said graphite coating and projecting exteriorly from the ends of said casing.

11. In a detachable indicator device, a paper medium treated with a hygroscopic solution having a cobalt chlorid base, a coating of graphite on the back of said paper medium, a transparent hermetically sealed casing inclosing said paper medium, a clamp means within each end of said casing for gripping and supporting said paper medium and electrically engaging its graphite coating, and spring contact fingers connected with said clamp means to project exteriorly from the ends of said casing for engagement with the terminal caps of a cartridge fuse to electrically and mechanically connect the indicator device with said cartridge fuse.

12. In a device of the kind described, a paper medium impregnated with cobalt chlorid adapted to change color through loss of moisture, an electrical heating element adjacent to said paper medium, and means for connecting said heating element in an electric circuit.

13. In a device of the kind described, a paper medium impregnated with cobalt chlorid adapted to change color through loss of moisture, an electrical heating element adjacent to said paper medium, a hermetically sealed transparent casing inclosing said paper medium and heating element, and contact means electrically connected with said heating element to project exteriorly from said casing.

In testimony, that I claim the invention set forth above I have hereunto set my hand this 11th day of May, 1918.

FREDERICK A. FELDKAMP.

Witnesses:
GEORGE D. RICHARDS,
EVA E. DESCH.